G. T. JOHNSON.
BALANCING MACHINE.
APPLICATION FILED JULY 13, 1918.

1,364,993. Patented Jan. 11, 1921.
7 SHEETS—SHEET 4.

Witness:
Fed C Larson

Inventor
Gustav T. Johnson
By Walter M. Fuller
Atty.

G. T. JOHNSON.
BALANCING MACHINE.
APPLICATION FILED JULY 13, 1918.

1,364,993.

Patented Jan. 11, 1921.
7 SHEETS—SHEET 7.

UNITED STATES PATENT OFFICE.

GUSTAVE T. JOHNSON, OF BELOIT, WISCONSIN.

BALANCING-MACHINE.

1,364,993.   Specification of Letters Patent.   Patented Jan. 11, 1921.

Application filed June 13, 1918. Serial No. 239,700.

*To all whom it may concern:*

Be it known that I, GUSTAVE T. JOHNSON, a subject of the King of Sweden, residing at Beloit, in the county of Rock and State of Wisconsin, have invented certain new and useful Improvements in Balancing-Machines, of which the following is a specification.

My invention relates to appliances for facilitating the securing of a perfect running balance of rotating bodies, eliminating the necessity of first putting the body in static balance, because the securing of the dynamic balance results in also obtaining the static or stationary balance, the latter being a necessary outcome of the former. This, of course, does not mean that the reverse is true, that is, that a statically-balanced body, one that will not rotate or turn on horizontal parallel knife edges, is necessarily in running balance.

The main or leading object of the invention is the provision of a machine of this type, which is simple in its structural characteristics, in which the test for balance may be effected during the rotation of the body without requiring the cessation of such movement, which will directly or by means of tables, scales, or charts, determine the amount and position of the balancing weight or weights to be added to or removed from the tested body, which can be operated with facility and precision at relatively low speeds without confusion to the operator as to which is the heavy side of the body by reason of the "critical speed" having been reached, and which can be effectively used by a comparatively unskilled workman with exactness and with proper results because of its practicality in action and the ease with which its method of operation may be understood. By this improved and novel appliance the exactness of the results accomplished and the short time required to effect them are important factors.

The machine, so far as I am at present advised, works upon an entirely new principle. The body to be tested as to balance is rotatively mounted on, or operatively associated with, a shaft in a frame or support capable of having a universal movement, and is rotated by power, the frame and its companion or allied elements being first balanced under the action of gravity. If the body is out of running balance, during its rotation the two ends of the frame or shaft on which the body is temporarily mounted will wabble or gyrate about an intermediate neutral point. Means are provided for so shifting the parts involved that such neutral or non-moving point may be brought or shifted into coincidence with the fulcrum of the frame. Adjustable weights of known centrifugal value are then manipulated so as to convert this wabbly or gyratory movement into one in which the shaft or frame moves or oscillates bodily parallel to its own axis. This is accomplished by adding weight or weights on the heavy side of the body but on the opposite side of such neutral point. The angular position and the amount of such weight or weights employed to effect such change or transformation of movement determines by proper calibration, translation, or interpretation, the amount and location of the weight or weights to be added to or subtracted from the body to effect the running balance desired.

In order that a full understanding of the invention, both from a structural and functional standpoint, and the underlying principles upon which the machine is operated may be had, I have illustrated in the accompanying drawings, forming a part of this specification and throughout the various views of which like reference characters refer to the same parts, two desirable and convenient embodiments of the invention, the one appliance adapted to test a body of simple form, such as a pulley, the other to test a body of more complicated shape, such as a crank-shaft.

Figure 1:
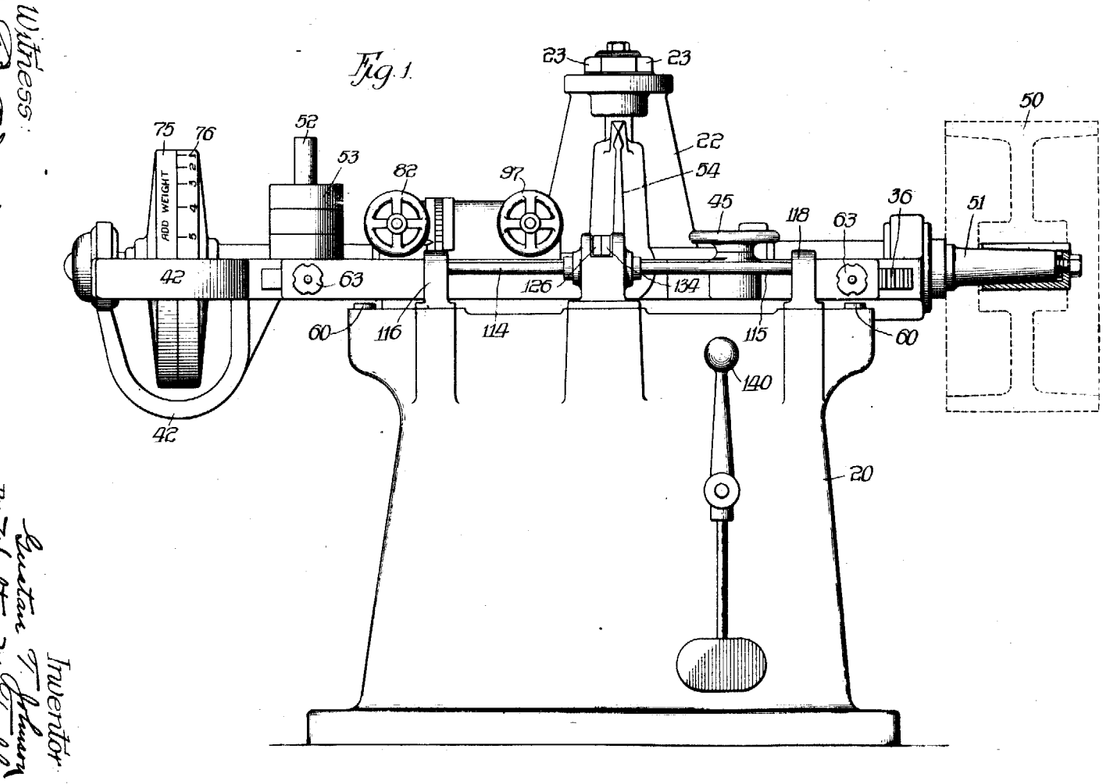
Figure 1 is a front elevation of the machine adapted to support at one end the body to be tested with relation to balance, such for example, as a pulley, shown in dotted lines in this figure.
Figure 2:
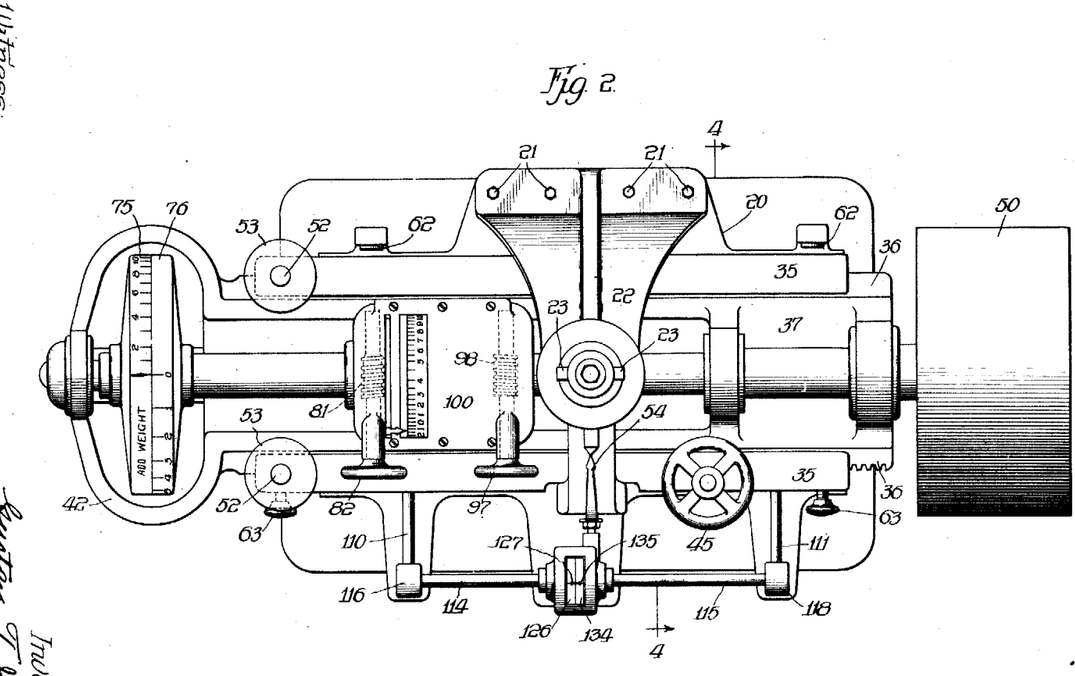
Fig. 2 is a plan view of the appliance.
Figure 3:
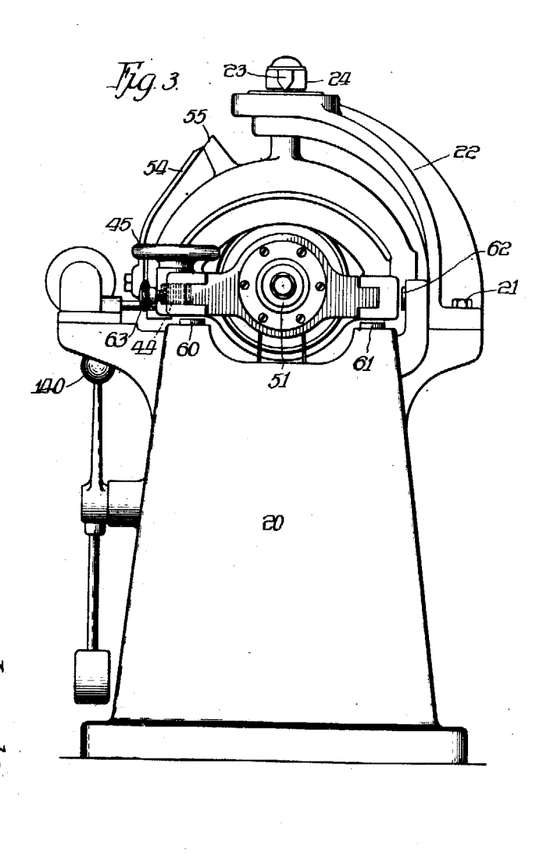
Fig. 3 is an end elevation of the same as viewed from the right-hand end of the machine.
Figure 4:
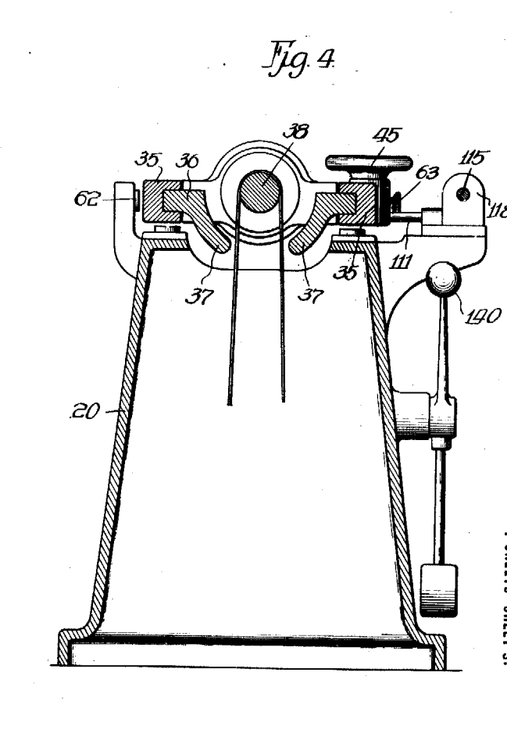
Fig. 4 is a vertical cross-section on line 4—4 of Fig. 2.

The appliance of Figs. 1 to 12 inclusive includes a main frame or standard 20 to the rear portion of which by bolts 21 an upwardly-curved forwardly-extended supporting-arm 22 is fastened, (Figs. 1, 2, and 3). The top surface of the front end of such arm affords bearings for a pair of alined knife-edge arms 23, 23, extended in opposite directions from a bearing-member 24 provided with a cap 25 (Fig. 10) and internally accommodating a horizontal ball-bearing 26 revolubly supporting a vertical arm 27 equipped with a depending yoke 28, the two spaced portions of the latter having a pair of alined ball-bearings 29 and 30 supporting gudgeons 31, 31, of a balanced, guiding, support or cradle 32, open on top and centrally apertured through its bottom at 33 to escape and accommodate a rubber or other elastic drive-belt 34. On its inner opposite faces this balanced cradle has guides 35, 35, slidingly receiving the outstanding longitudinal ribs 36, 36, of a slide-frame 37 equipped with a longitudinal shaft 38 (Fig. 5) revoluble in three ball-bearings 39, 40, and 41. As is clearly shown, one end of this frame at 42 comprises a series of bowed arms unitedly and conjointly supporting the bearing 41 at their adjacent ends. To permit longitudinal or lengthwise adjustment of this frame and the parts which it carries in the universally-mounted cradle, the former has a rack 43, (Fig. 5) on one edge, with which meshes a pinion 44 (Fig. 3) in the cradle, the pinion being rotated by a convenient handle 45. It should be obvious that this frame is bodily slidable in a support which itself is capable of universal movement freely in any direction. In order to indicate the relation of the position of the frame to the cradle in which it is slidingly adjustable I provide on the one a graduated scale 140 and on the other a coöperating vernier index 141.

The article to be tested with respect to balance, a pulley 50, for instance, is mounted on the tapered end 51 of shaft 38 by means of an expansion bushing of suitable type, and, in order that the cradle may be approximately balanced, to compensate for the mounting of the pulley thereon, it is provided near the other end with a pair of upstanding pins 52, 52, (Figs. 1 and 2) on which weights 53 may be placed. In order that the operator may know when the frame and its parts are in exact gravitational balance, a pointer 54 is mounted on the rockable cradle in any approved manner, and such pointer or needle co-acts with an index 55 on the yoke 28. To limit the swinging of the structural elements in various directions, rubber or other resilient bumpers 60, 61, 62, on the main support or standard, are provided. To enable the workman to fixedly lock the slide-frame 37 in adjusted or balanced position in the cradle, the latter has a pair of set-screws 63, 63, by means of which this result may be accomplished.

Figure 5:
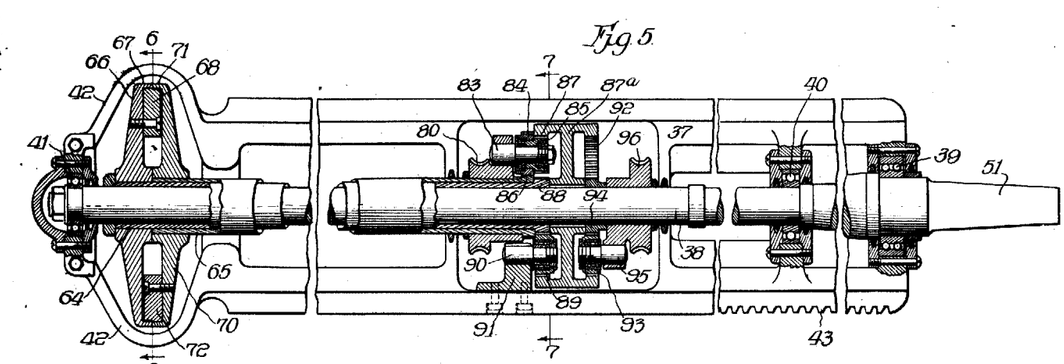
Fig. 5 is a horizontal section through the sliding or balancing frame and the parts which it carries.
Figures 6, 7:
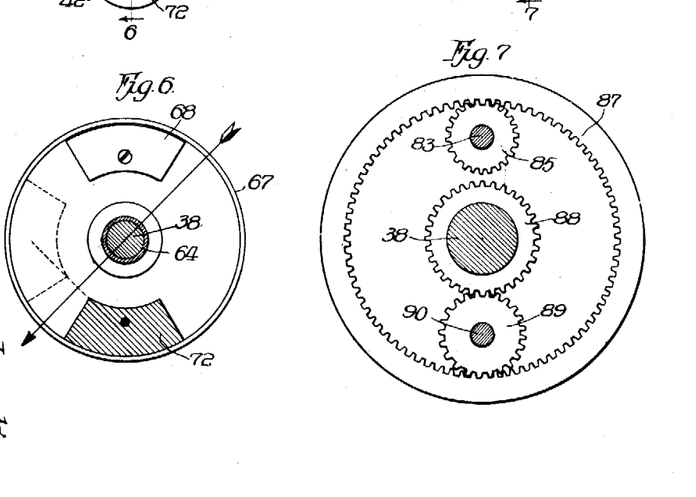
Fig. 6 is a vertical section on line 6—6 of Fig. 5.
Fig. 7 is a similar section on line 7—7 of Fig. 5.

For a part of the length of its left-hand portion, shaft 38 (Fig. 5) is surrounded by an inner-sleeve 64, and an outer-sleeve 65, the former having a disk member 66 fastened on the end thereof and provided with a marginal circular flange 67, such member carrying a sector-shaped weight 68, the other sleeve having a similar member 70 rigid thereon, equipped with a registering, oppositely-disposed, circular flange 71 and having mounted on it a like weight 72. These elements 68 and 72 are of exactly the same weight, are located in the same plane transverse to the shaft, and are normally 180 degrees apart, as shown in Fig. 5, whereby they are in exact static and dynamic or running balance. Mechanism is provided, however, for shifting these members 66 and 70 and their weights 68 and 72 angularly relatively to one another, as indicated in dotted lines in Fig. 6, the effect being as though a single weight had been added to the shaft at a point midway between the two weights in their new relation, and of an amount dependent upon the extent of movement of the one or the other weight. By the mechanism about to be described, this can be accomplished as the weights are revolving with the shaft, so that by such means a weight adjustable as to amount may, in effect, be mounted on the shaft without stopping the rotation of the latter. It is also desirable or necessary to vary the angular position of such resultant weight on the shaft, and this is accomplished by simultaneously revolving or turning both weights about the axis of the shaft while the latter is rotating without disturbing their relation one to the other. Suitable mechanism is also provided to permit this result.

These equal weights of known amount are so manipulated that their resultant weight is in the plane of the excess weight of the body being tested, and it is due to this condition that the shaft will have the bodily oscillation parallel to its own axis referred to. The fulcrum or center of wabble or gyration of the shaft need not be in the center of its length, but knowing the distance of such center from the resultant test weight, and the amount of the latter, we can determine the amount of the weight to be added to the body being tested and the location where it should be added or removed.

Revoluble on the outer-sleeve 65, I provide a worm-wheel 80 (Fig. 5), operable by a worm 81 (Fig. 2) rotatable by a conveniently-positioned hand-wheel 82. An extended portion of such worm-wheel carries a pin or stud-shaft 83 (Fig. 5) on which is rotatably mounted a duplex spur-gear 84, 85, of which the portion 84 in mesh with the gear 86 on the inner-end of tube 65 is of slightly greater diameter than the part 85 meshing with one adjacent set of gear-teeth 87 of a double internal-gear 87ª free to revolve on the shaft. The inner companion sleeve 64 has an adjacent gear 88 in mesh with a pinion 89 revoluble on a fixed stud 90 on a bracket 9b mounted on the slidable frame 37 and also in mesh with the part 87 of the larger double internal gear. The other or opposite portion 92 of such latter gear co-acts with a pinion 93, in mesh with a gear 94 pinned or otherwise fixed to shaft 38, such pinion 93 being revoluble on a pin or stud 95 on the hub of a worm-wheel 96 free to turn on shaft 38 and manipulated by handle 97 through a worm 98 (Fig. 2). Gears 86 and 88 are obviously of different diameters and the parts of the duplex gear or pinion 84, 85, differ in size from one another in the same relation or proportion.

Assuming that shaft 38 is being rotated by the rubber belt 34, the double internal-gear 87—92 will be revolved thereby through gear 94 fixed to the shaft, and the intermediate gear 93. The pinions 84, 85, and 89, being mounted on relatively-fixed studs, cause the two sleeves and their weights 68 and 72 to be rotated at the same speed as the shaft. When it is desired to shift one of these weights angularly relatively to the other, so as to secure the effect of adding a single resultant weight to the shaft, the operator turns the handle 82, worm 81, and worm-wheel 80, which modifies the position of pin 83, thus changing the angular relation of the sleeves to one another, causing a corresponding relative shifting of the weights. This can be done while the shaft and its associated elements are revolving.

Conceding now that it is desired to turn or angularly adjust both weights around the axis of the shaft simultaneously, and without disturbing or interfering with their relation one to another, the workman turns handle 97, which actuates worm 98 and worm-wheel 96. This movement, which may occur during rotation of the shaft, shifts the position of pin 95 and gear 93, causing an angular movement of gear 87—92 relatively to the shaft, this action through gears 84, 85, and 89, turning the two sleeves equally and simultaneously so that any angular position of the resultant weight, always midway between the two weights, may be obtained.

This gearing for adjustment or control of the weights, is incased in a stationary housing 100, (Fig. 2) provided with a graduated scale 101 and an adjacent slot 102 through which projects a pointer 103 fastened to the hub of worm-wheel 80, by means of which instrumentalities the extent of shifting the weights relatively to one another or the effective single weight added, may be readily determined while the parts are revolving. In addition, the matching or registering flanges 67 and 71 of the two members 66 and 70 are externally graduated at 75 and 76 respectively, and bear legends regarding adding or subtracting the weight disposed 180 degrees apart, and it should be noted that the graduations on the element 76 are twice as fine as those on the other element 75, for a purpose hereinafter indicated.

Figure 10:
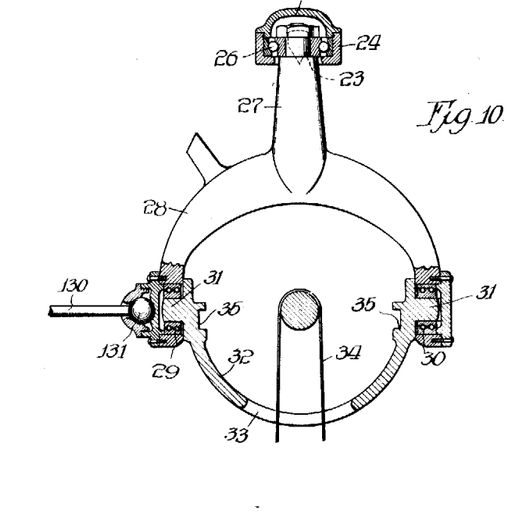
Fig. 10 shows partly in section the yoke support for the sliding frame and the means for rotating the shaft, the frame itself being omitted from the figure.
Figure 11:
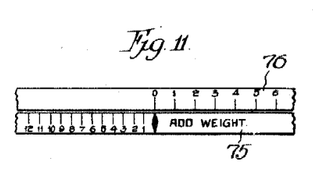
Fig. 11 illustrates the coöperating scales on the adjustable weight members.
Figure 12:
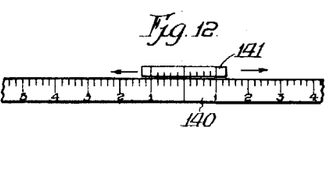
Fig. 12 shows co-acting scales on the sliding frame and supporting yoke.

The cradle 32 having the universal-joint mounting, at rather widely separated points along its length on opposite sides of such central mounting, has two racks 110 and 111 secured thereto in any approved manner, as by ball and socket joints like, or similar to that shown in Fig. 10, which belongs to another part of the machine. These racks co-act with pinions 112 and 113, respectively, on the end portions of alined shafts 114 and 115 revoluble in bearings 116 and 117 and 118 and 119 respectively, mounted on the main-frame. The adjacent bearings 117 and 119 may, if desired, form parts of a single central casting. On its inner end shaft 114 has a bevel-gear 120 and shaft 115 a like oppositely-arranged bevel-gear 121. Between these and meshing with the two is an interposed or intermediate bevel-pinion 122 revolubly mounted on a pin 123 in a support 124 equipped with gudgeons or journals 125 revoluble in bearings in the adjacent ends of the two shafts. At its upper end member 124 carries a plate 126 displaying an arrow 127.

Figure 8:
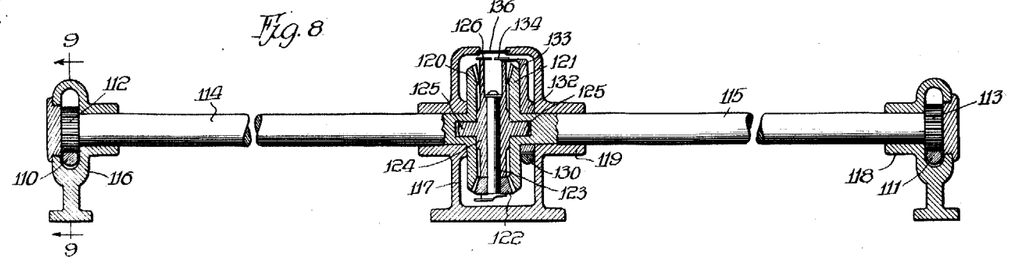
Fig. 8 illustrates in section the means for determining when the body is oscillating in the parallel manner specified.
Figure 9:
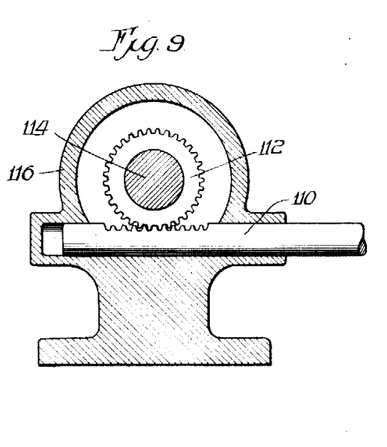
Fig. 9 is a cross-section on line 9—9 of Fig. 8.

Another rack 130 having gear-teeth on a portion only of its length, is connected by a ball-and-socket joint 131 (Fig. 10) to the geometrical center or neutral point of the yoke 28, and is in mesh with a gear 132 (Fig. 8) oscillatory on shaft 115 at one side of gear 121, such gear having an upstanding-arm 133 carrying a plate 134 beside plate 126 and displaying an arrow or index 135. These plates and arrows are visible through a window 136 just above them.

From an understanding of this construction, it will be clear that when the whole shaft wabbles or gyrates, that is, its two ends describe similar paths, but out of tune with one another, the two pointers or arrows 127 and 135 will stand still. This is due to the fact that the variation in the motions of the two ends, or, in other words, their movements being out of phase with one another, is compensated for by the rotation of gear 122 about its own axis rather than by a turning movement of the support 124. Accordingly, pointer 127 stands still. Inasmuch as rack 130 is connected to the neutral point of the structure, and when the shaft wabbles, such point does not move, accordingly the pointer or index 135 also remains stationary.

When, however, the shaft has been so weighted as to oscillate bodily parallel to itself, then such formerly neutral point moves back and forth crosswise the length of the shaft, and the rack 130 travels accordingly, actuating index 135 in similar manner. Also under the same conditions, the two ends of the shaft and its supporting framework travel back and forth in unison, and the two racks 110 and 111 move likewise and in synchronism with rack 130. Under these circumstances, pinion 122 travels bodily with the two bevel gears 120 and 121 and oscillates member 124 and index 127. When, therefore, both indices 127 and 135 travel or reciprocate in unison and together, it is evident that the shaft is oscillating in the parallel manner specified.

The operation of the machine is conducted practically as follows:

Assuming that it is desired to balance pulley 50, it is mounted on the tapered portion 51 of the shaft so as to rotate therewith. Thereupon, a sufficient number of weights 53 are applied to the retaining-pins 52 to approximately balance the frame 37 and its elements, including the pulley. Then to secure an exact balance, the frame is shifted lengthwise through rack 43 and pinion 44 by turning the handle 45 until a precise gravitational or scale balance is secured. Now, if desired, the frame may be fixedly held in the cradle by tightening set-screws 63, 63.

The shaft is then rotated at a relatively-slow speed through the elastic rubber-belt 34 taking around it and located directly beneath the point of suspension of the frame and shaft so that its operation does not interfere with the action of the appliance. This belt is driven from a pulley below controlled by a friction variable-speed appliance of any suitable character, which it has been deemed unnecessary to illustrate. It is controlled by a handle 140.

The tested pulley 50 being out of true, it causes the shaft to wabble or gyrate. Then the operator, by manipulating handles 82 and 97, shifts the movable weight and changes the angular disposition of the two weights until this wabbling is overcome and the shaft oscillates parallel to itself as indicated by the indices 127 and 135. The speed of rotation of the shaft is now increased slightly so that any fraction or portion of the unbalanced weight in the body will again manifest itself by causing the shaft to wabble or gyrate in slight degree, which action is overcome by readjusting the weights both singly and conjointly as explained and the parallel oscillation again established. This operation should be continued more or less depending upon the exactness required in the tested body, it being evident that a body revolving perfectly smoothly at a given speed may develop vibration slightly at a somewhat higher speed.

A reading on the scale 75 shows either directly or by reference to a properly-prepared chart or table, the weight necessary to be added to the pulley to secure a proper running balance, and by projecting over to the pulley, the angular position of such effective weight, we can then add such ascertained weight 180 degrees distant from such point or remove the amount of such weight from the pulley in alinement or register with the position of the effective weight. This weight should be added or subtracted in the plane of the center of gravity of the pulley, which plane can ordinarily be fairly accurately determined merely by the eye. With bodies of complicated shape, however, such plane may be readily ascertained preliminarily by means of a simple scale-beam. The angular position of the effective weight is always one-half way between the reading on scale 75 by the zero point of scale 76 and the zero position or graduation of scale 75. This position is easily determined on scale 75. If the reading on scale 76 is 4, for example, then the position of the numeral 4 on scale 75 is the correct angular position of the effective weight, this being due to the fact that the size of the graduations on scale 76 is double those on scale 75.

If the pulley is out of true running balance so that the addition of a single weight, or the removal of a weight at a single point would suffice, then the above is all that need be determined. Under other circumstances, however, it may be necessary to shift the shaft and frame lengthwise by manipulation of handle 45 to secure an exact correspondence in position of the center of oscillation or gyration and the static balance point to bring about the parallel oscillation specified, the reading on scale 140 with proper interpretations indicating the distance apart the two weights must be added on opposite sides the plane of center of gravity of the pulley to secure the running balance, each of such weights to be one-half of that derived from the reading of scale 75. It should be clear, therefore, that in using this appliance, the shaft supporting the element to be tested for running balance, is provided with a fulcrum permitting both ends of the shaft to wabble, the shaft being movable lengthwise relatively to such fulcrum, whereby a preliminary gravity or scale balance may be secured, and later, when the shaft and element are rotated, the neutral point of the shaft or center of wabble or gyration may be brought into register with the fulcrum. By manipulating the parts of the mechanism specified, the wabbling is neutralized or overcome, the shaft now oscillating bodily parallel to its own axis, and when this condition prevails, which is readily ascertainable by the indices specified, we have a situation permitting a determination of the amount of weight to be added to or subtracted from the element, and the exact point or points for such addition or subtraction to obtain the required dynamic balance. Such running balance is not actually secured in the machine; the latter merely permitting the ascertainment of what is necessary to be done with the tested element to give it running balance when removed from the machine.

In Figs. 13 to 17 inclusive, I have illustrated a modified structure for testing a body of more complicated shape, such as a crank-shaft, and in this case the cradle 151 is balanced and supported in the yoke as in the previous instance by opposite trunnions or gudgeons 152. The frame 153 is slidingly supported in the cradle to secure gravitational and gyroscopic balance and in this frame the crank-shaft to be examined is rotatively mounted in any approved manner as by the centers 154 and 155 and is revolved by shaft 156, these crank-shaft supporting elements being adjustable toward and from one another to permit the insertion and removal of the member to be tested and the employment of bodies of greater or less length. This is most easily brought about by making the supporting-bracket 157 carrying the adjustable center-piece 155 movable lengthwise the frame and held in position by tightening the screws or clamps 158. Any suitable sliding connection for the shaft 156 with the center-piece 154 may be provided so as to permit the specified sliding adjustment of the frame and its crank-shaft.

Frame 153 and its associated parts are adjustable by rack, pinion, and handle as previously described in connection with the other structure, but these parts have not been shown in Fig. 13.

Shaft 156 is rotated by a belt 159 engaging a pulley thereon or taking around the shaft direct. such belt co-acting with a pulley 160 on an outside longitudinal driveshaft 161 supported and revoluble in bearings 162, 162, on the cradle and rotated by a belt 163 coöperating with a pulley 164 located on the shaft in the plane of the trunnions 152, whereby oscillation of the cradle and frame will not disturb the driving connection and the latter will not interfere with the proper balancing of the parts.

Figures 13, 14:
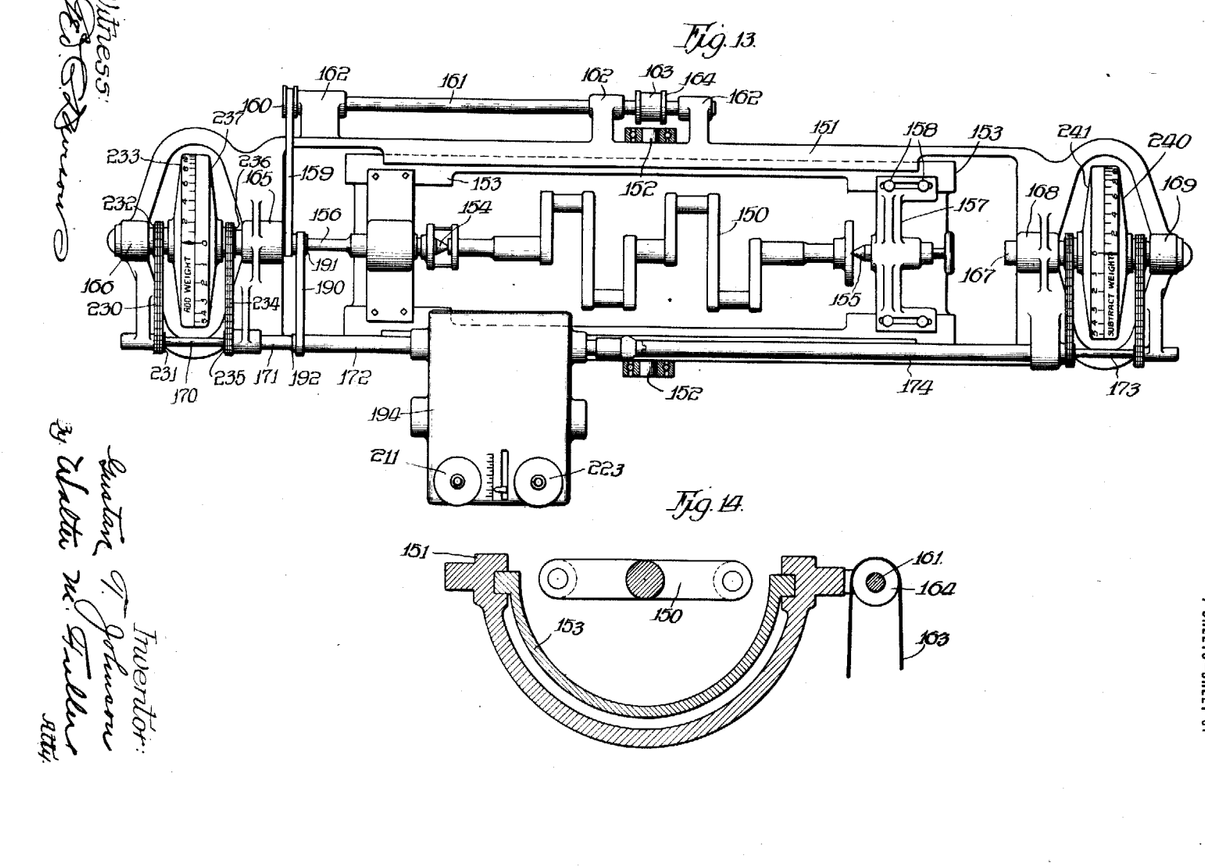
Fig. 13 depicts a modified structure, with certain parts omitted for clearness of illustration, for testing the balance of bodies, such as a crank-shaft, and has adjustable weights at its opposite ends between which the shaft to be tested is supported.
Fig. 14 shows in section the method of driving or rotating the shaft.

As is clearly shown in Fig. 13, this embodiment of the invention has a pair of the adjustable weights at each end of the cradle, the weights being capable of adjustment about the axis of the shaft 156 which, of course, is coincident with the main or primary axis of the crank-shaft. The weights at the left hand end of the appliance are mounted on the shaft 156 revoluble in bearings 165 and 166, but at the other end of the apparatus the companion weights are mounted on a short auxiliary or supplemental shaft 167 mounted in bearings 168 and 169. The driving mechanism for these weights which permits both sets to be simultaneously rotated or allows one set only to be revolved, will now be described.

Figure 16:
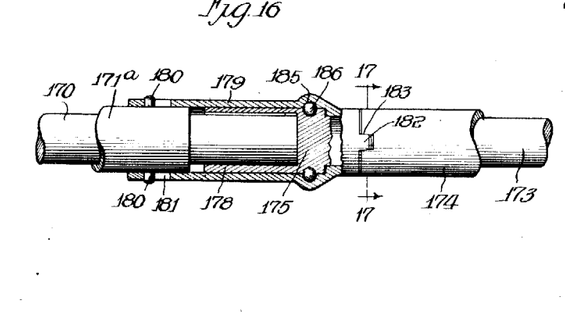
Fig. 16 is a longitudinal sectional view showing the clutch mechanism.
Figure 17:
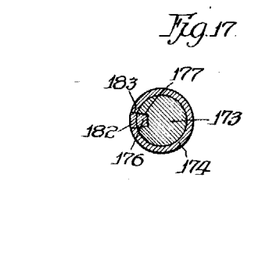
Fig. 17 is a transverse section on line 17—17 of Fig. 16.

Extended lengthwise the cradle and revoluble in suitable bearings is an inner shaft 170, an inner divided sleeve 171, 171ª, and an outer sleeve 172, the shaft and inner sleeve being in alinement respectively with another shaft section 173 and a second sleeve 174 adapted to be operatively connected and inoperatively disconnected by a clutch appliance. The latter comprises an interior clutch-member 175 fitted on the end of the shaft 170 and having a terminal tooth 176 adapted to engage a notch or cavity 177 in the adjacent end of shaft 173. A portion of member 175 is in the form of a sleeve 178 fitted over, lengthwise slidable on, and keyed to shaft 170. An exterior clutch sleeve 179 surrounds member 175—178 and an adjoining part of sleeve 171ª and is rotated by the latter through two extended radial pins 180, 180, fixed to sleeve 171 and accommodated in corresponding slots 181, 181, in sleeve 179. This form of connection permits sleeve 171ª to revolve member 179, the latter being also slidable relatively to the former without disturbing such connection. The other end of sleeve 179 has a tooth or lug 182 adapted to engage a cavity 183 in the adjacent end of 18( sleeve 174. Member 175 and sleeve 179 have registering annular grooves 184 and 185 respectively, each semi-cylindrical in cross-section, the two unitedly forming a round groove accommodating one or more balls 186. This construction permits the compound shaft 170—173 and the double sleeve 171ª—174 to rotate independently of one another and also the driving clutch connections between the two to be simultaneously broken by sliding sleeve 179 to the left which by the ball connection carries member 175 with it. This action, of course, disengages both teeth 176 and 182 from their recesses and breaks the clutch connection. In order to facilitate the closing of such clutch when rotating, tooth 176 is made slightly longer than tooth 182, whereby the shaft may be first picked up by its tooth and the sleeve 174 retarded or held stationary by hand to bring the sleeve tooth 182 into alinement with its recess.

Figure 15:
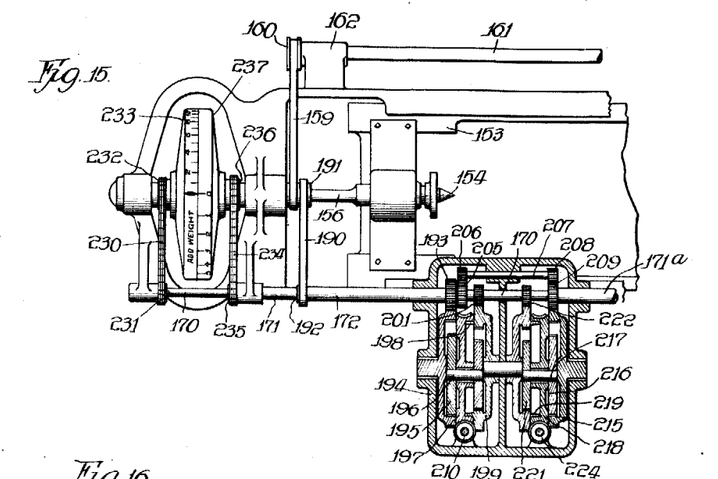
Fig. 15 illustrates the means for adjusting the weights, at both ends or one end of the appliance.

The outer sleeve 172 is rotated by shaft 156 by a sprocket or silent chain 190 co-acting with gears 191 and 192 on shaft 156 and sleeve 172 respectively. Any other suitable positive driving connection may be employed. Sleeve 172 by means of a pinion 193 thereon engaging the external teeth of a gear 194 revolves the latter, the internal teeth of such larger gear being in mesh with those of an inner gear 195 keyed or fixed to a shaft 196 eccentric to the axis of gear 194 and rotatably mounted in a bearing in a worm-wheel 197 revoluble on a circular flange bearing 198 projecting laterally from the side of another external-internal gear 199 whose inner teeth are in mesh with those of another gear 200 fixed to shaft 196. The outer teeth of the double gear 199 are in coöperative relation with a pinion 201 on sleeve 171. By these means the latter is rotated simultaneously with shaft 156 and the sizes of the gears are so chosen that the rotation of the sleeve is at the same speed as that of the shaft.

In order to likewise revolve the corresponding short sleeve 171ª, sleeve 171 is equipped with a spur-gear 205 meshing with a pinion 206 fixed to a suitably-journaled shaft 207 having at its other end a like pinion 208 coöperating with a gear 209 on sleeve 171ª. Worm-wheel 197 and the gears which it carries may be angularly adjusted in the ordinary manner by a worm 210 operable by a handle 211.

Gear 209 meshes with the outer teeth of another external-internal gear 215 whose inner teeth co-act with a gear 216 fixed to a shaft 217 revoluble in a bearing, eccentric to the axis of gear 215, in a worm-wheel 218 rotatable on a circular flange bearing 219 on still another double-gear 220 whose inner teeth are in mesh with a gear 221 fixed on shaft 217 and whose outer teeth are in mesh with a gear 222 fixed to shaft 170, between the spaced sleeve sections 171 and 171ª. Worm-wheel 218 may be adjusted angularly by handle 223 through the usual worm 224.

At one end of the appliance shaft 170 by any suitable form of positive gearing or drive connection such as a sprocket-chain or silent-chain 230 co-acting with toothed gears or sprocket-wheels 231 and 232 is operatively connected to the hub of the graduated weight member 233 corresponding to part 66 in the other embodiment of the invention. In a similar manner and by corresponding means 234, 234, and 236, sleeve 171 is connected to the hub of member 237 corresponding to part 70.

At the opposite end of the apparatus shaft 173 is rotatively associated by like means with the weight member 240 and sleeve 174 with weight member 241.

When handle 223 is turned and the clutch is in action, the weights of both pairs are adjusted angularly relatively to one another, and under similar conditions when handle 211 is turned the weights of both pairs are moved angularly about the axis of their shafts without disturbing their relation one to another. When the clutch connection is broken however, handles 223 and 211 control only the weight members 233 and 236 as will be readily understood.

It is to be noted that the clutch is so constructed that it can be made operative only when the parts are so related that when the weights of the two pairs are shifted from their positions exactly opposite one another their effective or resultant weights will always be in the same plane but on opposite sides of the centers of their shafts. The construction of the clutch prevents their association in any other relation.

This double ended device is operated in much the same way that the other or simpler embodiment of the invention is. If the unknown unbalancing weights are on opposite sides of the fulcrum of the appliance, then the adjustment weights at both ends are employed to secure a non-vibrating movement of the crank-shaft. If, on the other hand, the disturbing or unbalancing weight in the crank-shaft is wholly on one side of the fulcrum, the clutch is opened and one set of weights only is used. Under these conditions the unused weights have no effect on the oscillation of the shaft regardless of the position which such idle weights occupy when the clutch is rendered inoperative.

The indicator means for determining when the shaft is thus free from vibration have not been shown in Fig. 13, but, of course, they may be used as in the other embodiment of the invention, but their indices would be stationary when the body although revolving is in a non-vibratory state.

It should be observed that when the clutch is in action and both sets of weights are employed in the testing operation, one of such sets indicates "add weight" while the other specifies "subtract weight." The reason for this requirement is that when the body being tested wabbles about a point near the center of gravity it will require the weights on each end to be in the same plane as the unbalancing weights are but opposite thereto, thereby perfectly counteracting each other and regardless of the speed of rotation of the shaft, no vibration or wabble will be occasioned thereby.

To those skilled in this art it will be clear that the invention is not limited to the two embodiments presented but is susceptible of a variety of embodiments varying more or less in mechanical structure. Hence, the invention is not restricted to the precise and exact structural details shown and described, which may be modified within wide limits without departure from the substance and essence of the invention, and without the sacrifice of any of its substantial benefits and advantages.

I claim:

1. In an appliance of the character described, the combination of means to revolve the body to be tested, a weight, means to revolve said weight simultaneously with said body, means to adjust said weight angularly relatively to said body, a mounting for said revolving means, body and weight permitting them to wabble about a center intermediate their length, and means to longitudinally adjust said body, revolving means, and weight to bring their center of wabble into coincidence with the turning center of said mounting, substantially as described.

2. In an appliance of the character described, the combination of means to revolve the body to be tested, a weight, means to revolve said weight simultaneously with said body, a mounting for said revolving means, body, and weight permitting them to wabble about a center intermediate their length, and means to adjust said weight angularly relatively to said body during the rotation of said weight and body, substantially as described.

3. In an appliance of the character described, the combination of means to revolve the body to be tested, a weight, means to revolve said weight simultaneosly with said body, means to adjust said weight angularly relatively to said body during the rotation of the weight and body, a mounting for said revolving means, body, and weight permitting them to wabble about a center intermediate their length, and means to longitudinally adjust said body, revolving means, and weight to bring their center of wabble into coincidence with the turning center of said mounting, substantially as described.

4. In an appliance of the character described, the combination of means to revolve the body to be tested, a pair of weights, means to revolve said weights simultaneously with said body, a mounting for said revolving means, body, and weights permitting them to wabble about a center intermediate their length, and means to adjust said weights relatively to one another angularly with relation to said body, substantially as described.

5. In an appliance of the character described, the combination of means to revolve the body to be tested, a pair of weights, means to revolve said weights simultaneously with said body, means to adjust said weights relatively to one another angularly with relation to said body, a mounting for said revolving means, body, and weights permitting them to wabble about a center intermediate their length, and means to longitudinally adjust said body, revolving means, and weights, to bring their center of wabble into coincidence with the turning center of said mounting, substantially as described.

6. In an appliance of the character described, the combination of means to revolve the body to be tested, a mounting for said means and body permitting them to wabble about a center intermediate their length, a pair of weights carried by said mounting, means to revolve said weights simultaneously with said body, and means to adjust said weights relatively to one another angularly with relation to said body during the rotation of said weights and body, substantially as described.

7. In an appliance of the character described, the combination of means to revolve the body to be tested, a mounting for said means and body permitting them to wabble about a center intermediate their length, a pair of weights carried by said mounting, means to revolve said weights simultaneously with said body, means to adjust said weights relatively to one another angularly with relation to said body, and means to adjust said weights simultaneously angularly with relation to said body without disturbing their relation to one another, substantially as described.

8. In an appliance of the character described, the combination of means to revolve the body to be tested, a mounting for said means and body permitting them to wabble about a center intermediate their length, a pair of weights on said mounting, means to revolve said weights simultaneously with said body, means to adjust said weights relatively to one another angularly with relation to said body during the rotation of said weights and body, and means to adjust said weights simultaneously angularly with relation to said body during the rotation of said weights and body without disturbing the relation of said weights to one another, substantially as described.

9. In an appliance of the character described, the combination of means to rotatably support the body to be tested, a mounting for said means and body permitting the system comprising said means and body to wabble about a center intermediate its length, means to rotate said body and adjustable means to counteract such tendency to wabbly movement, substantially as described.

10. In an appliance of the character described, the combination of means to rotatably support the body to be tested, a mounting for said means and body permitting the system comprising said means and body to wabble about a center intermediate its length, means to rotate said body, and adjustable means to counteract such tendency to wabbly movement and adapted to cause such system to oscillate bodily with all positions of its axis parallel, substantially as described.

11. In an appliance of the character described, the combination of means to rotate the body to be tested, a mounting for said means and body permitting a wabbly and oscillatory movement thereof, and means to eliminate the wabbly movement of said means and body causing them to oscillate bodily with all positions of their axis parallel, substantially as described.

12. In an appliance of the character described, the combination of means to rotate the body to be tested, a mounting for said means and body permitting them to wabble about a center intermediate their length, means to adjust said means and body lengthwise relatively to said mounting, a weight carried by said mounting, means to revolve said weight simultaneously with said body, and means to adjust said weight angularly relatively to said body, substantially as described.

13. In an appliance of the character described, the combination of means to rotate the body to be tested, a mounting for said means and body permitting them to wabble and oscillate, means to adjust said means and body lengthwise relatively to said mounting, and means to eliminate the wabbly movement of said means and body causing them to oscillate bodily with all positions of their axis parallel, substantially as described.

14. In an appliance of the character described, the combination of means to rotate the body to be tested, a mounting for said means and body permitting them to wabble and oscillate, means to eliminate the wabbly movement of said means and body causing them to oscillate bodily with all positions of their axis parallel, and index means to indicate when such parallel oscillation is established, substantially as described.

15. In an appliance of the character described, the combination of means to rotate the body to be tested, a mounting for said means and body permitting them to wabble and oscillate, means to eliminate the wabbly movement of said means and body causing them to oscillate bodily with all positions of their axis parallel, and index means to indicate when such parallel oscillation is established, such index means comprising a pair of associated indices, means connecting one of said indices to the neutral point of said rotating means and body, and means connecting the other of said indices to points of and separated lengthwise said rotating means and body, substantially as described.

16. In an appliance of the character described, the combination of means to rotate the body to be tested, a mounting for said means and body permitting them to wabble and oscillate, means to eliminate the wabbly movement of said rotating means and body causing them to oscillate bodily with all positions of their axis parallel, and index means to indicate when such parallel oscillation is established, said index means comprising a pair of associated indices, means connecting one of said indices to the neutral point of said rotating means and body, and means connecting the other of said indices to said rotating means and body on opposite sides of said neutral point, substantially as described.

17. In an appliance of the character described, the combination of a support, a shaft on said support adapted to rotate the body to be tested, a weight on said support, means to rotate said weight simultaneously with said shaft and body, means to angularly adjust said weight about the axis of said shaft and body, a mounting for said support, shaft, body and weight permitting them to wabble, and means to adjust said support, shaft, body and weight longitudinally relatively to said mounting to bring their center of wabble into coincidence with the turning center of said mounting, substantially as described.

18. In an appliance of the character described, the combination of a yoke, a cradle pivoted in said yoke, a frame slidable in said cradle, bearings on said frame, a shaft adapted to rotate the body to be tested revoluble in said bearings, and means to rotate said shaft, substantially as described.

19. In an appliance of the character described, the combination of a support, a yoke movably mounted on said support, a cradle pivoted in said yoke, a frame slidable in said cradle, bearings on said frame, a shaft revoluble in said bearings and adapted to rotate the body to be tested, and means to rotate said shaft, substantially as described.

20. In an appliance of the character described, the combination of a support, a member having a rocking bearing on said support, a yoke supported by and capable of turning relatively to said member, a cradle pivoted in said yoke, a frame slidable in said cradle, bearings on said frame, a shaft rotatable in said bearings and adapted to revolve the body to be tested, and means to rotate said shaft, substantially as described.

21. In an appliance of the character described, the combination of a support, a shaft on said support adapted to revolve the member to be tested, means to rotate said shaft, a pair of equal weights sustained by said support in substantially the same plane transverse to said shaft, means to revolve said weights simultaneously with the revolution of said member, and means to turn said weights relatively to one another about and concentrically to the axis of said body, substantially as described.

22. In an appliance of the character described, the combination of a support, a shaft on said support adapted to revolve the member to be tested, means to rotate said shaft, a pair of equal weights sustained by said support in substantially the same plane transverse to said shaft, means to revolve said weights simultaneously with the revolution of said member, and means operable during the rotation of said weights to turn them relatively to one another concentrically about the axis of said body, substantially as described.

23. In an appliance of the character described, the combination of a support, a shaft on said support adapted to revolve the member to be tested, means to rotate said shaft, a pair of equal weights sustained by said support in substantially the same plane transverse to said shaft, means to revolve said weights simultaneously with the revolution of said member, means to turn said weights relatively to one another concentrically about the axis of said body, and means to turn said weights concentrically about the axis of said body without disturbing their relation to one another, substantially as described.

24. In an appliance of the character described, the combination of a support, a shaft on said support adapted to revolve the member to be tested, means to rotate said shaft, a pair of equal weights sustained by said support in substantially the same plane transverse to said shaft, means to revolve said weights simultaneously with the revolution of said member, means operable during the rotation of said weights to turn them relatively to one another concentrically about the axis of said body, and means operable during the revolution of said weights to turn them concentrically about the axis of said body without disturbing their relation to one another, substantially as described.

25. In an appliance of the character described, the combination of a support, a shaft on said support adapted to revolve the member to be tested, means to rotate said shaft, a pair of equal weights mounted on said shaft and disposed in substantially the same plane transverse thereto, means operable during the rotation of the shaft to turn said weights relatively to one another concentrically about the axis of the shaft, means operable during the rotation of the shaft to turn said weights concentrically about the axis of the shaft without disturbing their relation to one another, and means to rotate said weights simultaneously with the rotation of said shaft and body, substantially as described.

26. In an appliance of the character described, the combination of means to rotate the body to be tested, a weight adjustable angularly with respect to said body, means to rotate said weight simultaneously with said body, a mounting for said rotating means, body and weight, permitting them to wabble about an intermediate center, means to adjust said weight during its rotation, and means to indicate the adjustment of said weight readable during the rotation thereof, substantially as described.

27. In an appliance of the character described, the combination of means to support the body to be tested, a pair of weights angularly adjustable with respect to said body, means to rotate said body and weights, a mounting for said means, body and weights, means to angularly adjust said weights relatively to one another, means to adjust both of said weights with respect to said body without disturbing the relation of said weights one to the other, an index movable with one of said weights, and a second index movable with the other of said weights, substantially as described.

28. In an appliance of the character described, the combination of means to support the body to be tested, a pair of weights adjustable with respect to said body, means to rotate said body and weights, a mounting for said means, body and weights, means to adjust one of said weights relatively to the other, means to adjust both of said weights with respect to said body without disturbing the relation of the weights one to the other, a scale movable with one of said weights, and a second scale movable with the other of said weights, the graduations of one of said scales being twice those of the other scale, substantially as described.

29. In an appliance of the character described, the combination of two pairs of weights, means to simultaneously rotate the body to be tested and said weights, a mounting for said body and weights permitting them to wabble, and means to angularly adjust one weight of each pair relatively to its companion weight of the pair, substantially as described.

30. In an appliance of the character described, the combination of two pairs of weights, means to simultaneously rotate the body to be tested and said weights with the body between said pairs of weights, a mounting for said body and weights permitting them to wabble about an intermediate center, and means to angularly adjust the weights of each pair relatively to one another, substantially as described.

31. In an appliance of the character described, the combination of two pairs of weights, means to simultaneously rotate the body to be tested and said weights with the body between the pairs of weights, a mounting for said body and weights permitting them to wabble, and means to angularly adjust the weights of both pairs relatively to one another, substantially as described.

32. In an appliance of the character described, the combination of two pairs of weights, means to simultaneously rotate the body to be tested and said weights with the body between said pairs of weights, a mounting for said body and weights permitting them to wabble, and means to simultaneously angularly adjust the weights of both pairs relatively to one another during the rotation of said body and weights, substantially as described.

33. In an appliance of the character described, the combination of two pairs of weights, means to simultaneously rotate the body to be tested and said weights with the body between the pairs of weights, a mounting for said body and weights permitting them to wabble, and means to angularly adjust the weights of both pairs relatively to one another, the weights of each pair being equal and disposed in the same plane transverse to the axis of said body, substantially as described.

34. In an appliance of the character described, the combination of two pairs of weights, means to simultaneously rotate the body to be tested and said weights with the body between the pairs of weights, a mounting for said body and weights permitting them to wabble, means to angularly adjust the weights of both pairs relatively to one another, and means to angularly adjust the weights of both pairs without disturbing the relation of the weights of each pair to one another, substantially as described.

35. In an appliance of the character described, the combination of two pairs of weights, means to simultaneously rotate the body to be tested and said weights with the body between the pairs of weights, a mounting for said body and weights permitting them to wabble about an intermediate center, means to angularly adjust the weights of both pairs relatively to one another, and means to angularly adjust the weights of both pairs without disturbing the relation of the weights of each pair to one another, substantially as described.

36. In an appliance of the character described, the combination of two pairs of weights, the weights of each pair being equal, means to simultaneously rotate the body to be tested and said weights with the body between the pairs of weights, a mounting for said body and weights permitting them to wabble about an intermediate center, means operative during the rotation of said body and weights to angularly adjust the weights of both pairs relatively to one another, and means operative during the rotation of said body and weights to angularly adjust the weights of both pairs without disturbing the relation of the weights of each pair to one another, substantially as described.

37. In an appliance of the character described, the combination of means to support the body to be tested, two pairs of equal weights, means to simultaneously rotate the body and weights with the body between the pairs of weights, a mounting for said means, body, and weights permitting them wabble about an intermediate center, means to simultaneously adjust one weight of each pair relatively to the other weight of its pair during the rotation of said weights angularly about the axis of said body, and means to simultaneously adjust both pairs of weights angularly about the axis of said body during the rotation of said weights without disturbing the relation of the weights of each pair to one another, substantially as described.

38. In an appliance of the character described, the combination of two pairs of weights, means to support the body to be tested between said pairs of weights, means to rotate said body and weights, the weights of each pair being equal and disposed in the same plane transverse to the axis of said body, a mounting for said means, body, and weights permitting them to wabble about an intermediate center, means to simultaneously adjust the weights of each pair relatively to one another during the rotation of said weights, and means to simultaneously adjust both pairs of weights relatively to said body during the rotation of said body and weights, substantially as described.

39. In an appliance of the character described, the combination of two pairs of weights, means to support said weights and to support the body to be tested between said pairs of weights, means to rotate said body and weights, a mounting for said means, body, and weights permitting them to wabble about an intermediate center, means to adjust said supporting means relatively to said mounting to secure gravitational balance of said supporting means, body, and weights, means to adjust the weights of each pair relatively to one another, and means to adjust both pairs of weights relatively to said body without disturbing the relation of the weights of each pair to one another, substantially as described.

40. In an appliance of the character described, the combination of two pairs of weights, means to support said weights and to support the body to be tested between said pairs of weights, means to rotate said body and weights, a mounting for said means, body, and weights permitting them to wabble about an intermediate center, means to adjust said supporting means relatively to said mounting to secure gravitational balance of said supporting means, body, and weights, means to simultaneously angularly adjust the weights of each pair relatively to one another during the rotation of said body and weights, and means to simultaneously angularly adjust both pairs of weights relatively to said body without disturbing the relation of the weights of each pair to one another and during the rotation of said body and weights, substantially as described.

41. In an appliance of the character described, the combination of means to rotatably support the body to be tested, a mounting for said means and body permitting the system comprising said means and body to wabble about a center intermediate its length, means to rotate said body, means on said supporting means to counteract such tendency to wabbly movement, and means to secure gravitational balance of said supporting means, body, and counteracting means, substantially as described.

42. In an appliance of the character described, the combination of means to rotatably support the body to be tested, a mounting for said means and body permitting the system comprising said means and body to wabble about a center intermediate its length, means to rotate said body, adjustable means on said supporting means adapted to counteract such tendency to wabbly movement by causing such system to oscillate bodily with all positions of its axis parallel, and means to secure gravitational balance of said supporting means, body, and counteracting means, substantially as described.

43. In an appliance of the character described, the combination of means to rotatably support the body to be tested, a mounting for said means and body permitting the system comprising such means and body to wabble about a center intermediate its length, means to rotate said body, and means on said supporting means to counteract such tendency to wabbly movement adjustable during rotation of the body, substantially as described.

GUSTAVE T. JOHNSON.